United States Patent [19]

Martin et al.

[11] 4,124,657
[45] Nov. 7, 1978

[54] ROOM TEMPERATURE CURED ELASTOMER

[75] Inventors: Eugene C. Martin; Arnold Adicoff, both of Ridgecrest, Calif.

[73] Assignee: The United States of America as represented by the Secretary of the Navy, Washington, D.C.

[21] Appl. No.: 781,098

[22] Filed: Mar. 25, 1977

[51] Int. Cl.$^2$ .............................. C08F 8/00; C08F 8/02
[52] U.S. Cl. .................................. 260/879; 149/19.9; 526/47.6
[58] Field of Search ...................... 526/47.6; 260/879; 149/19.9

[56] References Cited

U.S. PATENT DOCUMENTS 3,758,426  9/1973  Boivin et al. .......................... 526/49

Primary Examiner—William F. Hamrock
Attorney, Agent, or Firm—R. S. Sciascia; Roy Miller; Lloyd E. K. Pohl

[57] ABSTRACT

Hydroxy terminated polybutadiene is reacted with naphthyl-potassium and 1-bromo-2,4-pentadiene in successive steps to form a bis(1,3-pentadienyl ether) derivative. Then the bismaleimide of dimer diamine is added to the polybutadiene derivative whereby a room temperature cure to an elastomer is achieved.

1 Claim, No Drawings

ROOM TEMPERATURE CURED ELASTOMER

BACKGROUND OF THE INVENTION

1. Field of the Invention

This invention relates to materials which may be utilized to form elastomers at room temperature and to the elastomers thus formed.

2. Description of the Prior Art

It is well known to use elastomers as binders for explosives, propellants and the like. Literally thousands of elastomers have been disclosed as being useful for such purposes. Despite the wide variety of elastomeric binders available, those wich have found wide spread use in propellants and the like have had one problem in common. That problem is the fact that they have only been curable at elevated temperatures. As a result of the need for elevated temperature cures, several sub-problems have developed.

One sub-problem or, in actuality, series of sub-problems stems from the fact that an oven is required if cure is to be carried out at an elevated temperature. Ovens are expensive. They require space. Elevated temperature cures require time. A propellant or the like must be handled in order to get it in the out of the oven. Finally, if an oven malfunctions, cure is not carried out properly and a batch of prepolymer is wasted.

More important than the sub-problems related to oven, are a series of sub-problems related to the fact that stresses are induced into an elastomer when it is cooled to ambient temperature after having been cured at an elevated temperature. These stresses often lead to cracking. Cracking is especially likely to occur if the elastomer is subjected to temperature cycling and such cycling is the rule rather than the exception.

Current theory in stress analysis is that once it is induced, stress is never entirely removed. Thus, if an elastomer is cooled below room temperature and subsequently raised back to room temperature those stresses that are induced by the cooling never completely disappear.

Since the stress is induced when an elastomer is cooled from cure temperature to ambient, it would be advantageous if cure could take place at ambient. This would eliminate a portion of the life history of a propellant or the like during which stress is induced.

SUMMARY OF THE INVENTION

According to this invention, the bis(2,4-pentadienyl ether) derivative of hydroxy terminated polybutadiene is prepared by reacting hydroxy terminated polybutadiene with naphthyl-potassium and 1-bromo-2,4-pentadiene in successive steps. Then, the bismaleimide of dimer diamine is added as a curing agent. Cure takes place at room temperature.

DESCRIPTION OF THE PREFERRED EMBODIMENT

The preferred embodiment may be understood from the following specific examples.

EXAMPLE 1

Preparation of the Bis(1,3-pentadienyl ether) of Hydroxy Terminated Polybutadiene Degassed hydroxy terminated polybutadiene (40.5g, 0.029 equivalent) was placed in a glass reaction vessel. The system was swept with helium and the flask was flamed. Next, 175 ml of pure oxygen-free dimethoxyethane and 175 ml of purified toluene were added to dissolve the polymer (hydroxy terminated polybutadiene). A 0.37 molar solution of naphthyl-potassium in dimethoxyethane was added dropwise until the light green color of unreacted naphthyl-potassium persisted for at least 5 minutes. A total of 0.031 equivalents of naphthyl-potassium were used. The reaction time was approximately 2.5 hours.

10.0 g (0.068 equivalent) of 1-bromo-2,4-pentadiene were dissolved in 25 ml of pure oxygen-free dimethoxyethane and added to the reaction mixture and the mixture was stirred for 3 hours at room temperature and for 1 hour at 85° C. (The helium atmosphere was maintained.)

The crude bis(1,3-pentadienyl ether) of hydroxy terminated polybutadiene was precipitated from the reaction mixture by adding methanol. It was dissolved in benzene and centrifuged to remove potassium bromide. Purification was accomplished by repeated precipitation from an ethylene dichloride solution using methanol. The derivative was then dried in a vacuum at room temperature. The yield was 34.8 g (85.9%). The polymeric derivative had a molecular weight of 3800 and contained 2.5 moles of conjugated double bonds per mole of polymer.

EXAMPLE 2

Pretreatment of Dimer Diamine 100 g of dimer diamine were dissolved in heptane and washed with aqueous sodium chloride solution containing 4.0 g of sodium hydroxide. This formed an emulsion which was shaken periodically and allowed to set for 18 hours. The organic layer was then washed twice with aqueous sodium chloride and ethanol was added to break the emulsion. The resulting mixture was then dried over sodium sulfate and in a vacuum to completely remove the solvent.

EXAMPLE 3

Preparation of the Bismaleimide of Dimer Diamine and Cyclization 60.0g (0.2 equivalent) of pretreated dimer diamine were dissolved in 50 ml of 1,1,2-trichlorethane and 22.6 g (0.23 mole) of maleic anhydride were dissolved in 125 ml of 1,1,2-trichloroethane. The system was swept with nitrogen and the dimer diamine solution was added to the maleic anhydride solution dropwise, keeping the temperature below 35° C. After the addition was complete, stirring was continued, under nitrogen, for 1.0 hours. This formed the bismaleamic acid.

4.29 g (0.02 mole) of magnesium acetate tetrahydrate, 49.0 g (0.48 mole) of acetic anhydride and 42.5 g (0.42 mole) of triethylamine were added. The temperature was rapidly raised to 94° C., held for 1 hour and then cooled to room temperature. This cyclized the acid into the bismaleimide.

The solvent was removed on a rotary evaporator. The crude product was dissolved in cyclohexane and washed twice with aqueous sodium chloride. A centrifuge was used to break the emulsion. The material was washed with aqueous sodium hydroxide solution and then with water until free of base. Then it was dried over anhydrous sodium sulfate. The solvent was removed and the material was dried in a vacuum. The crude bismaleimide was purified by column chromatography over Florisil and eluting with benzene.

EXAMPLE 4

Curing the Conjugated Diene Prepolymer Using the Bismaleimide of Dimer Diamine Enough of the cyclized bismaleimide was used to react with 88 percent of the conjugated double bonds; however, this range can be from approximately 80 percent to 100 percent.

0.3842 g of the bismaleimide of dimer diamine was added to 1.6612 g of the prepolymer, prepared according to Example 1, mixed and poured into a silicone mold. After curing for 48 hours at room temperature, the mixture had formed a clear elastomer having an elongation greater than 250 percent.

The foregoing examples are very specific. It will be apparent to those skilled in the art that other similar procedures might be used in lieu of those specified. For example, it will be apparent to skilled chemists that the cure takes place via a Diels-Alder reaction. Thus, bis-dienophiles other than the bismaleimide of dimer diamine could be used as the curing agent provided they (1) were soluble in the bis(1,3-pentadienyl ether) derivative of hydroxy terminated polybutadiene and (2) would react with it at room temperature. As another example, reactants other than naphthyl-potassium might be used to replace the hydrogen atoms of the hydroxy groups of hydroxy terminated polybutadiene with potassium or a similar alkali metal in the first step of the preparation of the bis(1,3-pentadienyl ether) derivative of hydroxy terminated polybutadiene. Also, the bromo group of 1-bromo-2,4-pentadiene might be replacable with a similar group such as a chloro group in the second step involved in the preparation of the bis(1,3-pentadienyl ether) derivative. Obviously, other inert gases could be used in lieu of the helium and nitrogen in the above outlines procedures.

Because of the stability of the carbon to carbon bonds formed during cure, the elastomer prepared according to this invention is highly resistant to hydrolytic or oxidative degradation. Also, since the cure process involves the formation of carbon to carbon bonds, other components such as trace metal impurities in the formulation do not have an effect thereon.

The elastomer is suitable for use as a binder in either explosive compositions or propellant compositions.

What is claimed is:

1. The derivative produced by reacting hydroxy terminated polybutadiene with naphthyl-potassium in dimethoxyethane to form a first product and then reacting said first product with 1-bromo-2,4-pentadiene.

* * * * *